United States Patent
Lorello et al.

(10) Patent No.: US 11,201,883 B2
(45) Date of Patent: *Dec. 14, 2021

(54) SYSTEM, METHOD, AND APPARATUS FOR DATA LOSS PREVENTION

(71) Applicant: SECULORE SOLUTIONS, LLC, Odenton, MD (US)

(72) Inventors: Timothy J. Lorello, Gambrills, MD (US); Alexander James Lorello, Gambrills, MD (US)

(73) Assignee: SECULORE SOLUTIONS, LLC, Odenton, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,778

(22) Filed: Sep. 17, 2019

(65) Prior Publication Data
US 2020/0014717 A1 Jan. 9, 2020

Related U.S. Application Data

(63) Continuation of application No. 15/587,583, filed on May 5, 2017, now Pat. No. 10,419,467.
(Continued)

(51) Int. Cl.
*H04L 29/06* (2006.01)
*G06F 21/62* (2013.01)

(52) U.S. Cl.
CPC ...... *H04L 63/1425* (2013.01); *H04L 63/0263* (2013.01); *H04L 63/1408* (2013.01);
(Continued)

(58) Field of Classification Search
CPC .................................................. H04L 63/1425
See application file for complete search history.

(56) References Cited

U.S. PATENT DOCUMENTS

| 2011/0023118 | A1* | 1/2011 | Wright | G06F 11/28 |
| | | | | 726/23 |
| 2016/0080419 | A1* | 3/2016 | Schiappa | H04L 63/20 |
| | | | | 726/1 |

(Continued)

*Primary Examiner* — Simon P Kanaan
(74) *Attorney, Agent, or Firm* — Whiteford, Taylor & Preston, LLP; Gregory M. Stone

(57) ABSTRACT

Disclosed is a computer security device configured to monitor data traffic between computing devices on a local area network and an external network in order to protect the local area network against unauthorized access and data exfiltration. Such computer security device includes each of a data transport module, a management information module, and a data storage module, each of which are operable independently of the other modules, but which modules together form the single computer security device. The computer security device is configured for connection between a router on a local network that is to be protected and a wide area network, such as the Internet, which such local network communicates with. The computer security device monitors data traffic, collecting it for analysis and data visualization, creating alerts upon detection of potentially dangerous communications, and blocking, redirecting, or replacing such data with corrupted data or predetermined innocuous information in a similar format to the original data. Methods of using such a computer security device are also disclosed.

24 Claims, 5 Drawing Sheets

Related U.S. Application Data

(60) Provisional application No. 62/332,667, filed on May 6, 2016.

(52) U.S. Cl.
CPC ...... *H04L 63/1416* (2013.01); *H04L 63/1441* (2013.01); *G06F 21/6218* (2013.01)

(56) References Cited

U.S. PATENT DOCUMENTS

2016/0191465 A1* 6/2016 Thomas .................. H04L 63/20 726/1
2017/0339177 A1* 11/2017 Lorello ............... H04L 63/1425

\* cited by examiner

SYSTEM, METHOD, AND APPARATUS FOR DATA LOSS PREVENTION

CROSS REFERENCE TO RELATED APPLICATION

This application is a continuation of U.S. patent application Ser. No. 15/587,583 entitled "System, Method and Apparatus for Data Loss Prevention," filed with the U.S. Patent and Trademark Office on May 5, 2017 by the inventors herein and now U.S. Pat. No. 10,419,467 issued on Sep. 17, 2019, which application is based upon and claims benefit of U.S. Provisional Patent Application Ser. No. 62/332,667 entitled "System, Method, and Apparatus for Data Loss Prevention," filed with the U.S. Patent and Trademark Office on May 6, 2016 by the inventors herein, the specifications of which are incorporated herein by reference in their entireties.

FIELD OF THE INVENTION

This invention relates generally to computer network security, and more particularly to the secure monitoring, analysis, and management of data that is sent to and from a computer network.

BACKGROUND OF THE INVENTION

Computer networks and the online sharing (including reception and dissemination) of data have added significant convenience in conducting individual, consumer, and corporate activities. Unfortunately, however, such convenience also brings added risk of unauthorized access to data, and particularly sensitive data.

Computing users ranging from individuals to large corporations often employ computer networks comprised of various computing and so-called "smart" devices, such as desktop and laptop computers, tablets, smart phones, smart televisions, smart appliances, and the like, interconnected to form local area networks (LAN). LAN's today typically rely upon a firewall, router, switch or gateway to interconnect to a wide area network (WAN), such as the Internet. Typically, these devices provide static firewall settings that are based upon configured rules which determine the Internet Protocol (IP) traffic that may enter into or leave the LAN. These firewalls are static in nature, are difficult to interface with, are rarely modified by the user, and are themselves typically discoverable by entities in the WAN. They rely on user input and provide limited information about the data that enters or exits the LAN, maintaining basic log information that is hard to share outside of the firewall and which, therefore, is typically ignored.

More sophisticated firewalls are costly and are typically only available to larger networks, since they generally require a sophisticated user to establish the appropriate rules used to allow or deny communications.

Software firewalls are also available on many operating systems, but these firewalls typically only protect one specific node on the network (i.e., the computer running the particular operating system that includes the firewall).

In the home market, these firewalls are static in nature. For hardware-based firewalls, the end user must remember the IP address assigned to the firewall. This generates an unwieldy interface, and therefore they are rarely modified. As a result, desired traffic is often blocked. For example, this happens often with individuals interested in playing internet- or LAN-based games. The user is typically asked to disable software-based firewalls when playing such games, thus removing the protection of the firewall at a critical point of vulnerability. To avoid this annoyance, firewall settings are left open and too much traffic is allowed, presenting the opportunity for virus contamination.

Thus, because these firewalls require users to statically modify the rules associated with them, they are infrequently modified and the rules are loosely defined so as to allow multiple types of activity. This results in poor protection and difficult user interfaces for the "technically challenged."

This phenomena explains the plethora of hacker scenarios, whether network-initiated or client-side in nature. The very porous nature of today's firewalls make them less likely to detect and stop data loss associated with current hacking capabilities.

Firewall settings and policies are determined by the end user. As stated previously, because these are hard/awkward/inconvenient to change, the end user typically keeps the settings loose, undermining the firewall's protection.

More recently, firewalls have been known to apply more dynamic policies based upon the data traversing the network—essentially trying to learn the user's habits and keeping the firewall protection tight when it detects traffic deviations. But this practice still relies on the LAN network patterns, while stronger protection should rely on a broader set of data and statistics.

Because firewall settings and policies must be configured by the end user or network manager, requiring some skill in cybersecurity policies, the firewall settings in home and small business environments are not robust enough to provide adequate protection.

The user provisioning interfaces that maintain this static data must be used in advance of internet activity. Again, because of the nuisance factor associated with this approach, the firewall settings are often very loose or even wide open.

Software-based firewalls typically provide user-notifications, but they require software installed on the end-user LAN node to present such notifications, cannot interact with third parties on behalf of end-user nodes, and only protect a single node on the network in such a fashion.

Many networks combine loose static settings on hardware-based firewalls with more robust settings on software-based firewalls.

However, home networks may include network nodes that are not managed by an end user. The introduction of multiple internet-capable devices has made the hardware/software combination untenable. For example, a home network with computers, phones and tablets may have other network elements: e.g., internet-capable TVs, baby monitors, thermostats and home security systems. In the future, various appliances will also likely be capable of internet activity, and none of these systems are expected to have software-based firewalls, leaving security gaps in this combination approach.

Further, in small business environments, the employee typically lacks the time, motivation or knowledge to properly maintain software firewall settings. And current systems do not provide the network security manager of the business with the ability to serve as a third party to manage the firewall settings on behalf of the employees, again leaving security gaps in the combination approach.

Moreover, hardware-based firewalls are network nodes on the LAN. Because they have IP addresses that are, by definition, discoverable by the outside world, clever hackers can typically scan such firewalls and determine the type of firewall protecting the LAN. This allows the hacker to identify specific types of cyber exploits which can compromise the firewall, resulting in network penetration and data loss.

Likewise, hardware-based firewalls provided for home and small-business environments typically only provide logs that the user can peruse to determine the state of traffic on the LAN. Reviewing such logs requires logging into the router (an infrequent task). A limited set of state information of various nodes on the network may be available, but there is no visualization presentation of the network and no analysis of data traffic.

Some analysis and visualization is available through complementary software packages that can assess the data traffic of the router, assuming that the router supports the sharing of its data (e.g., a router may have to be put into "promiscuous mode" in order to share its data with another node on the network which would do the data analysis). This type of analysis requires Information Technology (IT) knowledge not often found in the end user/network manager, particularly in a home environment.

Furthermore, firewalls focus on defending against unknown incoming traffic. For web browsing and other LAN to WAN activities to be unimpeded, firewalls are often configured to allow all outgoing traffic. Client-side attacks happen when the end user unknowingly initiates a connection to a malicious server through email or insecure browsing, thus completely bypassing the firewall.

Even if a firewall did block outgoing malicious traffic associated with a client-side attack, the malicious software that initiated the traffic would not be detected or quarantined. Instead, the malicious software would continue to send communications attempts to a WAN IP address.

Firewalls are configured by end users via configuration interfaces accessed either via web services (for hardware-based systems) or via a custom-software interface (for software-based systems). As such, their configurations can be accessed remotely should a hacker gain access an end-user node within the LAN.

This is a common technique for cyber attacks. Gaining password access to the firewall gives access to the firewall configuration. Many home and small business firewalls are installed by Internet Service Providers, and they often want remote access so that they can assist the user or override the firewall settings. Such access opens the door to cyber attacks that attempt to impersonate the ISP or the end-user, thereby rendering the entire firewall open to bypass techniques.

Previous efforts have been made to monitor data flowing into and exiting from a network for purposes of detecting and preventing data theft and unauthorized access. For example, U.S. Pat. No. 7,890,612 of Todd et al. discloses a method and apparatus for regulating network data flow that uses a device to intercept network traffic and analyze such traffic to detect various threats. The Todd et al. device includes a single central processing unit that administers the analytical functions to detect threats, and attempts to make the device undetectable by requiring that all updates to the device, such as definitions of what does and does not comprise a threat, are carried out through a physical interface, as opposed to allowing remote access through, for example, an addressable element on the device having its own IP address. While such device may be useful for the detection and blocking of certain threats, it does little to provide instantaneous visibility into the nature of the threat or to allow users to closely monitor the types of threats being experienced by various elements of the local network that the device is intended to protect. Likewise, the requirement for a physical interface to provide updates to threat definitions renders it difficult for administrative users to provide urgent updates when necessary, but is necessary in the device of Todd et al. to prevent detection of the device to computers outside of the local network that is under protection. Further, U.S. Pat. No. 8,176,544 of Keanini et al. describes a network security system having a device profiler that monitors network nodes and identifies vulnerabilities, in an effort to allow network traffic monitors and a firewall to protect the network elements. Still further, U.S. Pat. No. 9,369,370 of Chow et al. describes a network management device that collects operational condition information about a LAN and WAN, such as network congestion, power consumption, bandwidth utilization, security breach, network intrusion, faults, usage patterns, performance measures, and connection quality, and generates diagnostic reports relating to such conditions. Even further, U.S. Pat. No. 8,893,278 of Chechik describes a gateway positioned between a user computer and a WAN, which gateway monitors attributes of data transmissions to determine and identify malware transmissions. Malware attributes are maintained by a separate "behavior server." Finally, PCT App. Pub. No. WO 2016/014178 of Heilig describes a method for detecting malicious network activity, which method uses network "taps" to collect and compare incoming and outgoing data packets on individual network elements to identify unauthorized data packets. The disclosures of each of the foregoing are incorporated herein by reference in their entireties.

Despite such prior efforts, there remains a need in the art for an easily implemented computer security device that is capable of monitoring all data traffic flowing into and leaving from a local network that is to be protected, while remaining wholly undetectable to the outside world, but that allows remote access for easy and quick updating of threat definitions and full visibility into both the nature of the threat and identification of the local network elements that are under attack or threat of attack.

SUMMARY OF THE INVENTION

Disclosed herein are an apparatus, system and methods that intercept communications between a user-controlled LAN environment and the WAN provided by the user's Internet Service Provider (ISP). A hardware element intercepts all traffic entering and leaving the LAN, inspecting the traffic to determine if it is received from or destined for a monitored WAN endpoint. If the WAN endpoint has been flagged as "suspicious," the apparatus will either block communications, modify the communications, or notify a user or appropriate third party, requesting further communications instructions.

The system, methods, and apparatus described herein utilize techniques to assume the identity of either end of the LAN/WAN interface or to otherwise pass the data transparently, making their protective methods undetectable from the WAN environment. Insertion of the apparatus described herein into the LAN/WAN interconnection does not require any additional configuration since it is able to detect and assume the necessary identities to monitor communications.

The apparatus and methods it employs store summary information about the interaction for later analysis and visualization.

The apparatus and methods described herein operate with user-entered and/or crowd-sourced information that maintains the monitoring status of the WAN endpoints. Preferably at least four operating modes are defined and implemented: Green (traffic may proceed), Yellow (traffic may proceed but the designated user is notified), Blue (traffic may not proceed unless the designated user provides permission) and Red (traffic may not proceed). The designated user might be the end user of a node in the LAN, another node in the LAN or an entity outside of the LAN.

The apparatus described herein utilizes a single appliance positioned between the firewall, router or other terminal point on the LAN and the access point to the WAN (such as an Ethernet connection to an external Internet service provider). That single appliance includes a data transport module through which all data travelling to or from the protected network must pass. The data transport module thus may monitor and analyze all network traffic to determine what, if any, action is to be taken with a particular data transmission, and may then take a predesignated or instructed action on a data transmission upon detection of a threat (i.e., a potentially malicious transmission). The data transport module also generates a copy of at least a portion of all data passing through the data transport module over a given period of time, such that upon detection of a threat, all or a portion of the data passing through the network for a pre-defined period prior to such detection is available for review. The appliance also includes a data storage module that includes threat definitions used by the data transport module (e.g., data types that may indicate a need for greater security or attempted unauthorized access, known nefarious third party website addresses, etc.), and may be accessed by the data transport module to allow writing of data traffic or condensed versions thereof, and reading of data and updating of the processes carried out by the data transport module to determine if a particular data transmission is a security threat. Still further, the appliance includes a management information module that provides a user interface to the appliance, allowing a user to provide updates to the data storage module with new and/or updated threat information, and to analyze data collected over a period of time by the data transport module. While the data storage module communicates with each of the data transport module and the management information module, it also blocks any communication between the data transport module and the management information module.

Each of the data transport module, the data storage module, and the management information module is a separate processing element with its own, independent operating system, such that the three elements function independently of one another within the computer security device. While the management information module may write to and read from the data storage module, the management information module is entirely isolated from communication with the data transport module, such that the management information module is wholly undetectable from the perspective of the data transport module or data travelling across it. To provide such user interface while preventing communication with the data transport module, the management information module may have its own IP address on the network that is under protection, such that it can only be seen by the outside world as a separate element on the LAN under protection. Such configuration prevents detection of the management information module as having any ability to effect the operation of the data transport module, or even detection of the existence of the data transport module, thus keeping the data transport module truly undetectable to the outside world while still providing a remotely accessible user interface for urgent updating of threat definitions and visibility into the nature of threats to which the LAN is exposed.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
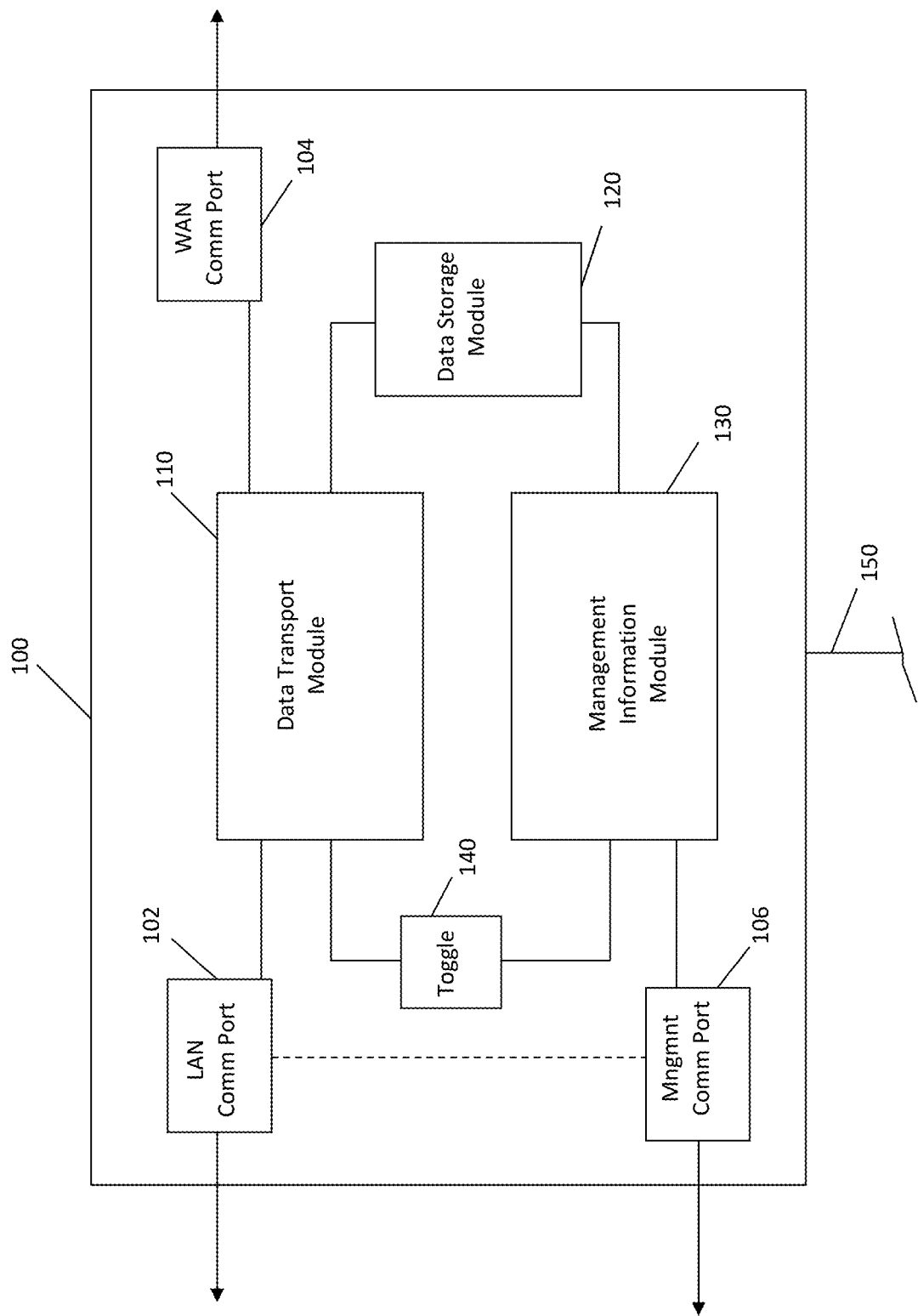
FIG. 1 is a schematic view of a computer security device in accordance with certain aspects of an embodiment of the invention.

FIG. 1 is a schematic view of a computer security device (shown generally at 100) in accordance with certain aspects of an embodiment of the invention. Computer security device 100 comprises a single appliance (i.e., a device having a single housing) that includes a data transport module 110, a data storage module 120, and a management information module 130, each of which elements is discussed in greater detail below. A LAN communication port 102 provides a physical port for connecting computer security device 100 to a LAN that is to be protected, and preferably to the initiating point of the LAN, such as a router. Likewise, a WAN communication port 104 provides a physical port for connecting computer security device 100 to a WAN, such as the Internet, for example via a user's wall connection (e.g., an Ethernet port) to their Internet service provider's service. LAN communication port 102, data transport module 110, and WAN communication port 104 may form a data bridge through which all data traffic flowing to or from the LAN must pass. Further, management communication port 106 provides a port for connecting management information module 130 to the router, preferably through a separate connection from LAN communication port 102.

As shown in FIG. 1, management information module 130 is in data communication with data storage module 120. Likewise, data transport module 110 is in data communication with data storage module 120. Importantly, however, there exists no communication channel within computer security device 100 between data transport module 110 and management information module 130, thus preventing direct communication between data transport module 110 and management information module 130, which ensures that data transport module 110 cannot be detected from the WAN. As a result, unauthorized access to or other interference with the data storage module's 110 function becomes far more difficult and would require an underlying understanding of the data structures used by the data transport module 110. As discussed in greater detail below, management information module 130 may communicate, however, through the LAN's router with nodes on the LAN to receive instructions and to provide a user interface by which a user may visualize data collected by computer security device 100, such as by providing management information module 130 with its own IP address as an element on the LAN.

Computer security device 100 also includes a manual toggle 140 capable of manually changing an operating mode of computer security device 100. More particularly, hardware toggle 140 allows a user to manually set an operating mode of the data transport module 110 to one of at least four modes: monitoring, guarding, remote access or block, as discussed in greater detail below.

Figure 2:
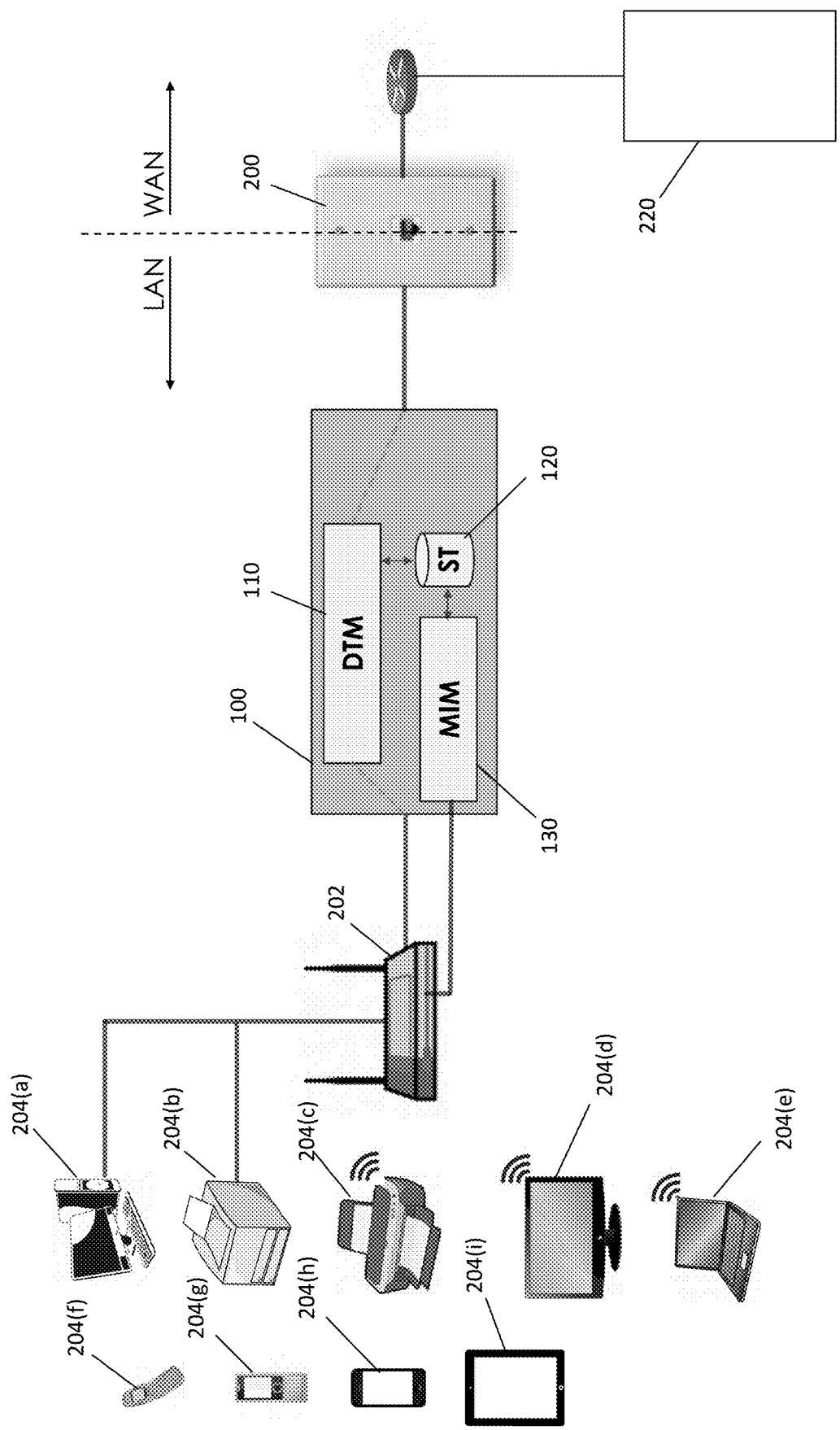
FIG. 2 is a schematic view of a system employing the computer security device of FIG. 1.

FIG. 2 is a schematic view showing the positioning of computer security device 100 with respect to a computer network. The LAN network lies to the left of the depicted Ethernet wall socket 200 (although wall socket 200 may comprise any connection to a WAN to which the protected LAN is to connect). The WAN network lies to the right of wall socket 200. The computer security device 100 according to aspects of an embodiment of the invention sits between the Ethernet wall socket 200 and the router 202, such as a wireless router of standard configuration, supporting the LAN. In an exemplary configuration, the LAN is comprised of multiple nodes 204(*a*), 204(*b*), . . . 204(*i*), depicted as desk computers, hard-networked printers, wireless printers, internet-capable TVs, wireless laptops, older cell phones (that support Wi-Fi mode), smartphones, and tablets. Those skilled in the art will recognize that other elements may form nodes in the LAN, including smart appliances and any other element, now existing or to be available in the future, that may access the Internet.

As shown in FIG. 2, computer security device 100 is positioned to intercept all traffic entering or leaving the LAN, to monitor and archive at least some portion of that traffic (by copying at least a portion of the data as it traverses data management module 100 to data storage module 100 and holding it there for some predetermined window of time), and take action to protect the LAN from infection or data exfiltration by determining at data transport module 110 whether a particular data transmission is potentially problematic or malicious and, in response to such determination, causing the data transport module 110 to allow the transmission to proceed, notify a user of a potentially problematic data transmission, automatically block the transmission, automatically redirect the transmission, or automatically modify the data transmission. Moreover, the computer security device is positioned so as to carry out such activities while remaining invisible to at least the WAN, making it significantly incorruptible to outside attack.

With continued reference to FIG. 2, data transport module 110 defines a first data path that is independent from any communication between management information module 130 and the LAN, and independent from any communication between management information module 130 and data storage module 120. This keeps the data transport module 110 invisible to the WAN. In certain configurations, the data transport module 110 includes instructions that cause it to assume the identity of other elements of the network in order to keep it invisible to the network. Specifically, for data packets that are incoming to the LAN from the WAN (i.e., arriving at computer security device 100 through WAN communication port 104), the data transport module 110 may mirror the IP address of the transmitting element in the WAN when transmitting the data packet through LAN communication port 102 to the router 202 of the LAN, such that from the perspective of that router 202, the data transport module 110 is indistinguishable from the transmitting element in the WAN. Likewise, for data packets that are outgoing to the WAN from the LAN (i.e., arriving at computer security device 100 through LAN communication port 102), the data transport module 110 may mirror the IP address of the router 202 of the LAN, such that from the perspective of the now receiving element in the WAN, the data transport module 110 is indistinguishable from the router 202 of the LAN. This further makes the data transport module 110 invisible and wholly undetectable to other elements on either of the LAN and/or the WAN. This approach allows firewalls to work unimpeded on the LAN side of the network (i.e., the router 202 could have a firewall, or a firewall could be inserted between the computer security device 100 and the LAN router 202).

Data transport module 110 also stores computer instructions, and more particularly analytical rules (which data transport module 110 copies from data storage module 120) that define criteria establishing problematic and/or malicious data transmissions, and instructions for handling data transmissions after making a determination of whether or not a particular data transmission is problematic and/or malicious. Specifically, data transport module 110 includes computer instructions that cause data transport module 110 to analyze data traffic by comparing such data traffic against a rule set to determine what action is to be taken on such data traffic. For instance, the rule set stored on data transport module 110 may include specifically known, nefarious IP addresses, data packets containing data of a specific format (e.g., data having a format indicative of social security numbers, credit card numbers, etc.), data packets attempting to access data of a specific format, data packets containing instructions for local network elements to take particular actions, etc. Data transport module 110 may use known techniques to, for example, analyze data packet headers, metadata, and packet data payload in making such determinations of whether a data transmission is problematic.

Meanwhile, management information module 130 may be seen as a separately addressable node on the LAN, having its own IP address. This allows interfacing with the management information module 130 in a website interface from other elements on the LAN to provide new instructions and threat definitions through management information module 130 to data storage module 120 (which updated instructions and threat definitions may then be copied from data storage module 120 to data transport module 110), and to provide a user interface through which a user may visualize and analyze data that has been copied to data storage module 120 from data transport module 110 for a given time period, using known data visualization tools executable on management information module 130. Preferably, configuring management information module 130 as a separately addressable LAN node with its own IP address likewise allows connection to a trusted external source, such as a third party administrative computer server 220, for updating of instructions and threat definitions.

Computer security device 100, and preferably each of the modules running on it, maintain an operating system and control software independent of the operating system and software on elements of the local area network that is being protected. More particularly, each of data transport module 110, management information module 130, and data storage module 120 carries out its own processing in a separate processing environment from the other modules of the computer security device 100. In certain configurations, each of data transport module 110, management information module 130, and data storage module 120 has not only its own, separate and independent operating system, but likewise its own memory and processor, making each module an independent processing unit. By way of non-limiting example, each of data transport module 110, management information module 130, and data storage module 120 may include their own respective CPU, such as a solid-state CPU, and flash-based, non-volatile memory for storing persistent data associated with each respective module. Likewise, each of data transport module 110, management information module 130, and data storage module 120 may comprise their own respective partitioned processor on a single CPU, or such other configuration that provides for independent, separate processing to be carried out by each module. With these configurations, computer security device 100 remains operably separate from the LAN computing elements, helping it to remain invisible to external elements in the WAN.

In order to enable communication with computer security device 100, a user may remotely interface with management information module 130 through management communication port 106. In certain configurations, such interface may be provided by way of a cabled connection from an open Ethernet port on router 202 to management communication port 106, with management information module 130 configured as an additional node on the LAN side of the network with a distinct IP address. Though not accessed through the WAN side of the network, it may still be detectable as an open port on the LAN.

In other configurations, such interface between a user and management information module 130 may be provided by way of a serial USB interface between an open USB port on router 202 and management communication port 106, with management information module 130 configured as a mounted USB device accessible to any LAN element allowed by router 202.

In yet other configurations, such interface between a user and management information module 130 may be provided by way of wireless communication, such as (by way of non-limiting example) a wireless communication channel conforming to IEEE 802.11 specifications between a wireless communication device on router 202 and management communication port 106 (likewise equipped with a wireless communication device of known configuration), with management information module 130 configured as a wirelessly connected device, accessible to any LAN element allowed by the LAN router 202.

In still further configurations, such interface between a user and management information module 130 may be provided by way of a single Ethernet interface on computer security device 100, such that LAN communication port 102 and management communication port 106 share a common physical Ethernet port, with management information module 130 having its own distinct IP address as discussed above.

Referring again to FIG. 1, computer security device 100 may receive power 150 in a number of ways. For instance, computer security device 100 may receive power 150 via Power Over Ethernet (POE) provided by the interface from the ISP Gateway. In home configurations, such power may be available from ISP-provided hardware on the local premise. In enterprise configurations, such power may be available from the same power distribution system that powers the distributed Wi-Fi access nodes. Alternatively, computer security device 100 may receive power 150 via Power Over USB (POUSB) provided by the interface from the LAN router 202. Still further, computer security device 100 may receive power 150 via a piggy-back plug, in which the plug provides power to the device but provides a back-end plug into which the LAN router 202 may be plugged. This approach allows the same wall plug to be used by both the router 202 and the computer security device 100, useful in situations where there is not another available wall outlet near the LAN router 202.

Figure 3:
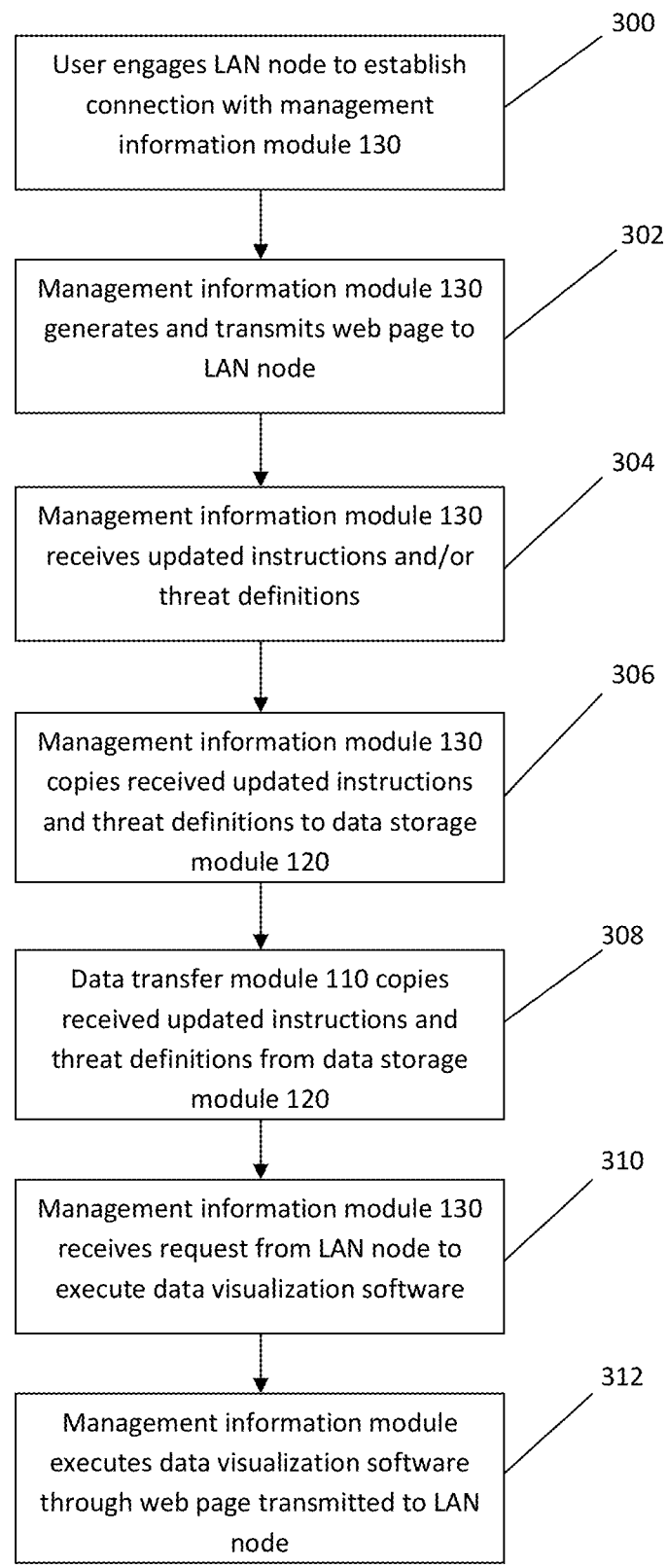
FIG. 3 is a flow chart showing a method for providing updated instructions and/or threat definitions to the computer security device of FIG. 1 according to certain aspects of an embodiment of the invention.

FIG. 3 is a flow chart depicting an exemplary method for providing updated instructions and/or threat definitions to management information module 130. As discussed above, management information module 130 is configured as a distinct LAN node with its own IP address, allowing a user within the LAN (downstream from router 202) to communicate with management information module 130 (upstream from router 202) as if they both were in fact downstream of router 202. This configuration allows a user to interface with management information module 130 through a web page interface initiated on the LAN. Thus, as shown at FIG. 3, at step 300 a user engages a LAN node, such as laptop computer 204(*e*), to establish for example a TCP/IP connection with management information module 130, and at step 302 management information module 130 generates and transmits a web page to LAN node 204(*e*). At step 304, management information module 130 receives from LAN node 204(*e*) any available updated instructions and threat definitions. Then, at step 306, management information module 130 copies any received updated instructions and threat definitions to data storage module 120. Next, at step 308, data transport module 110 copies any received updated instructions and threat definitions from data storage module 120. Optionally, at step 310, management information module 130 may receive a request from LAN node 204(*e*) to execute data visualization software, at which instruction management information module 130 at step 312 executes such data visualization software through the web page transmitted to LAN node 204(*e*). All of such processing allows the functions of computer security device 100 to be carried out, including data visualization and analysis, without requiring a user to install any software on their own computers or other devices on the LAN.

Figure 4:
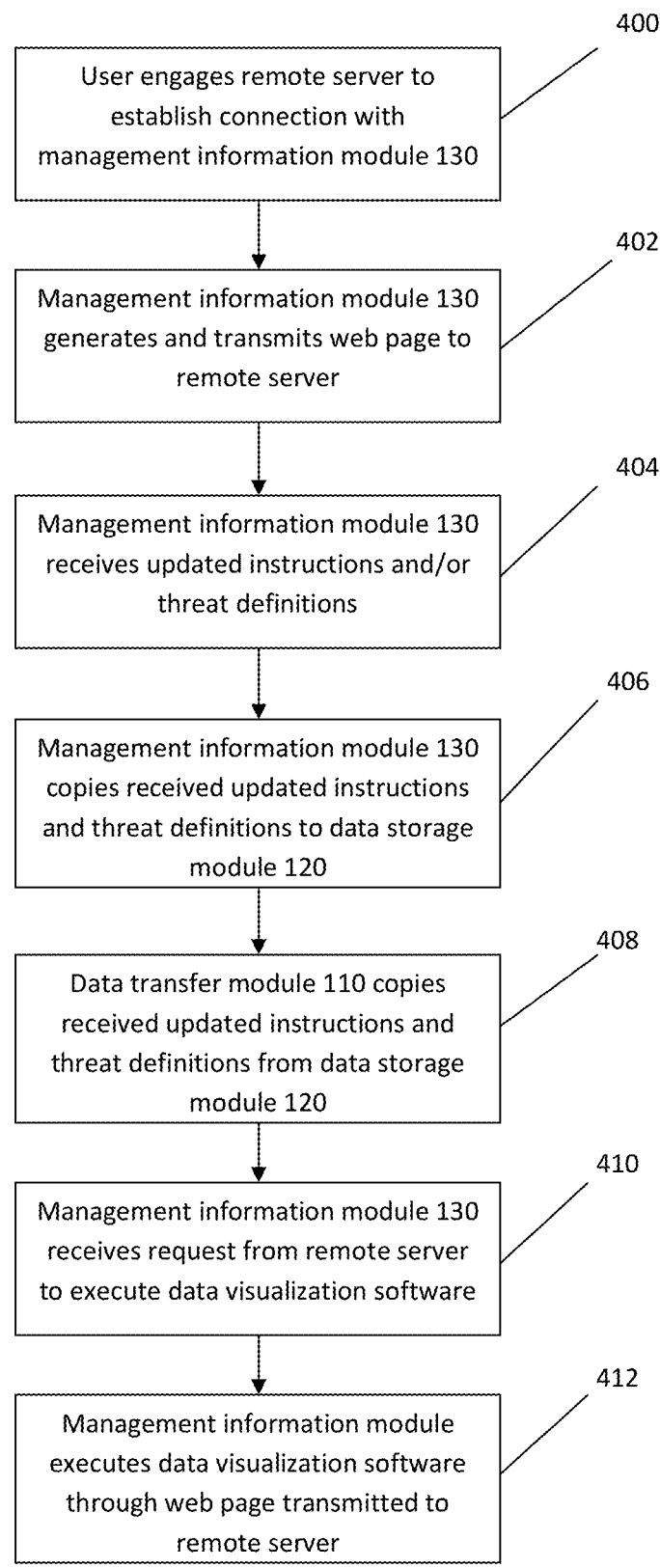
FIG. 4 is a flow chart showing another method for providing updated instructions and/or threat definitions to the computer security device of FIG. 1 according to certain aspects of an embodiment of the invention.

Similarly, FIG. 4 is a flow chart depicting another exemplary method for providing updated instructions and/or threat definitions to management information module 130. Once again, management information module 130 is configured as a distinct LAN node with its own IP address, allowing a trusted external website on a trusted server 220 to communicate with management information module 130 as if management information module 130 were a LAN node downstream of router 202. This configuration allows a third party, remote user to interface with management information module 130, optionally again through a web page interface initiated on the trusted server 220. Thus, as shown at FIG. 4, at step 400 a user engages server 220 to establish for example a TCP/IP connection with management information module 130 (with such communication channel extending from the WAN, through WAN communication port 104 to data transport module 110, from data transport module 110 through LAN communication port 102 to router 202, and from router 202 to management information module 130), and at step 402 management information module 130 generates and transmits a web page to remote server 202 (though trusted server 202 may alternatively communicate with management information module 130 through direct file transfer and without establishing a web page interface without departing from the scope of the invention). At step 404, management information module 130 receives from remote server 220 any available updated instructions and threat definitions. Then, at step 406, management information module 130 copies any received updated instructions and threat definitions to data storage module 120. Next, at step 408, data transport module 110 copies any received updated instructions and threat definitions from data storage module 120. Optionally, at step 410, management information module 130 may receive a request from remote server 220 to execute data visualization software, at which instruction management information module 130 at step 412 executes such data visualization software through the web page transmitted to remote server 220. In certain configurations, remote server 220 may comprise a cloud-based, crowd-sourced database that progressively collects crowd-sourced knowledge of problematic websites and such other data that may indicate unauthorized attempts to access data as may occur to those skilled in the art. Moreover, such configuration may enable the updating of entirely separate and independent computer security devices 100 installed on various LAN's en masse.

Preferably, upon initialization of computer security device 100, data transport module 110 reads initial configuration information (including, by way of non-limiting example, a previously stored data set of instructions and threat definitions) from data storage module 120.

Upon detection that a data transmission is problematic, data transport module 110 preferably sends a communication to a designated person's computer terminal serving as a local area network monitor (e.g., a specific LAN node associated with an authorized user, administrator, designated network monitor, etc.) to notify such designated person of the suspicious or problematic transmission, such as (by way of non-limiting example) reception of a web page or other data from a suspicious IP address. From the data transmission itself (e.g., the data headers in such transmission), data transport module 110 knows which internal LAN node is communicating with the sender of such problematic data transmission.

In one configuration, data transport module 110 uses this information to launch the notification process to the internal LAN node that is communicating with the sender of the problematic or malicious data transmission. Such notification could be provided, by way of non-limiting example, in-line to the end-user associated with that internal LAN node (an addition to an HTML web interaction), by way of a newly generated email notification to the end-user, or by sending an alert to another application on the end-user's LAN node. Notably, such notification requires no additional software to be installed on the end-user LAN node. Such configuration employs a processing element outside and upstream of a LAN's firewall (i.e., the data transport module 110) informing a processing element inside and downstream of the LAN's firewall (i.e., the subject internal LAN node) about activity that is occurring on the LAN. Moreover, such alert is carried out without requiring the subject LAN node to install any additional or specialized software on their computer. For example, in the event that the data transmission comprises a web page from a suspicious website, the data transport module 110 may modify the web page to include a hyperlink (e.g., a specialized graphic indicating a warning message from the computer security device 100) that, when clicked by the end user, opens up either a notification message or linked notification webpage informing the end user of the threat, and/or initiates the web server on management information module 130 to allow the end user to manage how such transmission is treated by the computer security device 100.

In another configuration, data transport module 110 uses this information to launch the notification process to a third party LAN node (i.e., another node on the same LAN that is separate from the LAN node that is communicating with the sender of the problematic or malicious data transmission), which third party LAN node has been designated as, for example, an authorized internal LAN node as might be associated with a network administrator responsible for managing an entity's computer network. Such notification could be provided, by way of non-limiting example, in-line to the designated third party end-user (an addition to an HTML web interaction), provided via an email notification to the third party end-user, or provided by sending an alert to another application on the third party end-user's node. Once again, such configuration employs a processing element outside and upstream of a LAN's firewall (i.e., the data transport module 110) informing a processing element inside and downstream of the LAN's firewall (i.e., the designated third party LAN node) about activity that is occurring on the LAN. And again, such alert is carried out without requiring the designated third party end user to install any additional or specialized software on their computer. Moreover, such configuration allows monitoring of an Internet-enabled device, such as by way of non-limiting example a LAN node comprising a smart LED device or the like, that lacks any user interface, to cause the data transport module 110 to generate an alert to another LAN node that does have an interface, such as an administrative IT manager, of a problem with data communication with such Internet-enabled device.

In still yet another configuration, data transport module 110 uses this information to launch the notification process to an appropriate external end-user node (which, in this exemplary configuration, is a third party node which has been designated as an authorized external node in the WAN). The external third party could then provide notification to an appropriate end user via email, text messaging or via another alerting mechanism (such as a network security fob).

In each of the notification cases described above, after notifying the appropriate user of the problematic data transmission, that end user may provide instruction to computer security device 100 on how to handle the problematic transmission (e.g., to proceed with communications or take alternate action). Such instruction may be provided by way of a hyperlink in an email message, web page, or other electronic transmission from data transport module 110 to the designated end user, in each case allowing such designated end user to interface with management information module 130 to provide an updated instruction concerning how such data transmission is to be treated—i.e., passed through computer security device 100, dumped or dropped, or modified/replaced with camouflage data. Alternatively, data transport module 110 may automatically take certain action with regard to detection of a problematic data transmission.

For example, a data transmission that is detected as originating from a known suspicious IP address, or that originates from the LAN but is destined for a known suspicious IP address, may be automatically dropped or blocked from transmission by data transport module 110. In the event of the detection of such a data transmission, the dropping or blocking of such data transmission by data transport module 110 is preferably logged to allow later review by a user interfacing with management information module 130. In certain configurations, a user notification need not be provided for such automatically dropped or blocked data transmissions.

Likewise, a data transmission that is detected as soliciting information that a user likely does not intend to transmit, such as personal or other sensitive information (including by way of non-limiting example credit card information), may be blocked by data transport module 110, or optionally may be intercepted and replaced with alternative data. In the case of such a data transmission, data transport module 10 determines that an incoming data transmission is soliciting such sensitive information, or that an outgoing data transmission is sending such sensitive information to an IP address not recognized as one that would typically receive such sensitive information (e.g., not recognized as an actual bank or commercial website with which the user typically interacts). Upon such detection, data transport module 110 intercepts the data transmission and drops it from proceeding, and preferably generates and sends to the suspicious IP address a replacement data transmission comprising false data that has a similar format to the data originally sought by the malicious data transmission. By way of non-limiting example, data transport module 110 may detect that credit card information is being sent from a LAN node to a malicious WAN IP address. The data transport module 110 may replace the end-user's credit card number with another number that, for example, has an FBI trace flag on it or a bank fraud flag, alerting authorities to the illicit transaction and immediately initiating law enforcement response. In certain configurations, a user notification need not be provided for such automatically replaced data transmissions.

As mentioned above, in order to allow the analysis of data traversing computer security device 100, at least a portion of preferably all data transmissions passing through data transport module 110 are copied to data storage module 120. For example, data storage module 120 may include writable memory that is continuously updated by receiving a copy of at least a portion of data passing through data transport module 110, maintaining therein all data transmissions that passed through data transport module 110 for a designated prior period of time, for example, the 60 minute period prior to any given instant in time. By storing a copy of such data transmissions, and most preferably metadata associated with each data packet traversing data transport module 110, a user may engage management information module 130 upon receiving an alert of a problematic data transmission to analyze and visualize all traffic for such designated prior period of time, which may be helpful in determining the source and extent of the attempted security breach. By way of non-limiting example, the following data elements may be captured from each data packet traversing data transport module 110 (not exhaustive): date; time; size of data element/packet/file; origination IP address/port; destination IP address/port; source application on origination node (if inside LAN); filename (if applicable); and WAN IP address (or domain name), which preferably will be translated into a geographic location.

Figure 5:
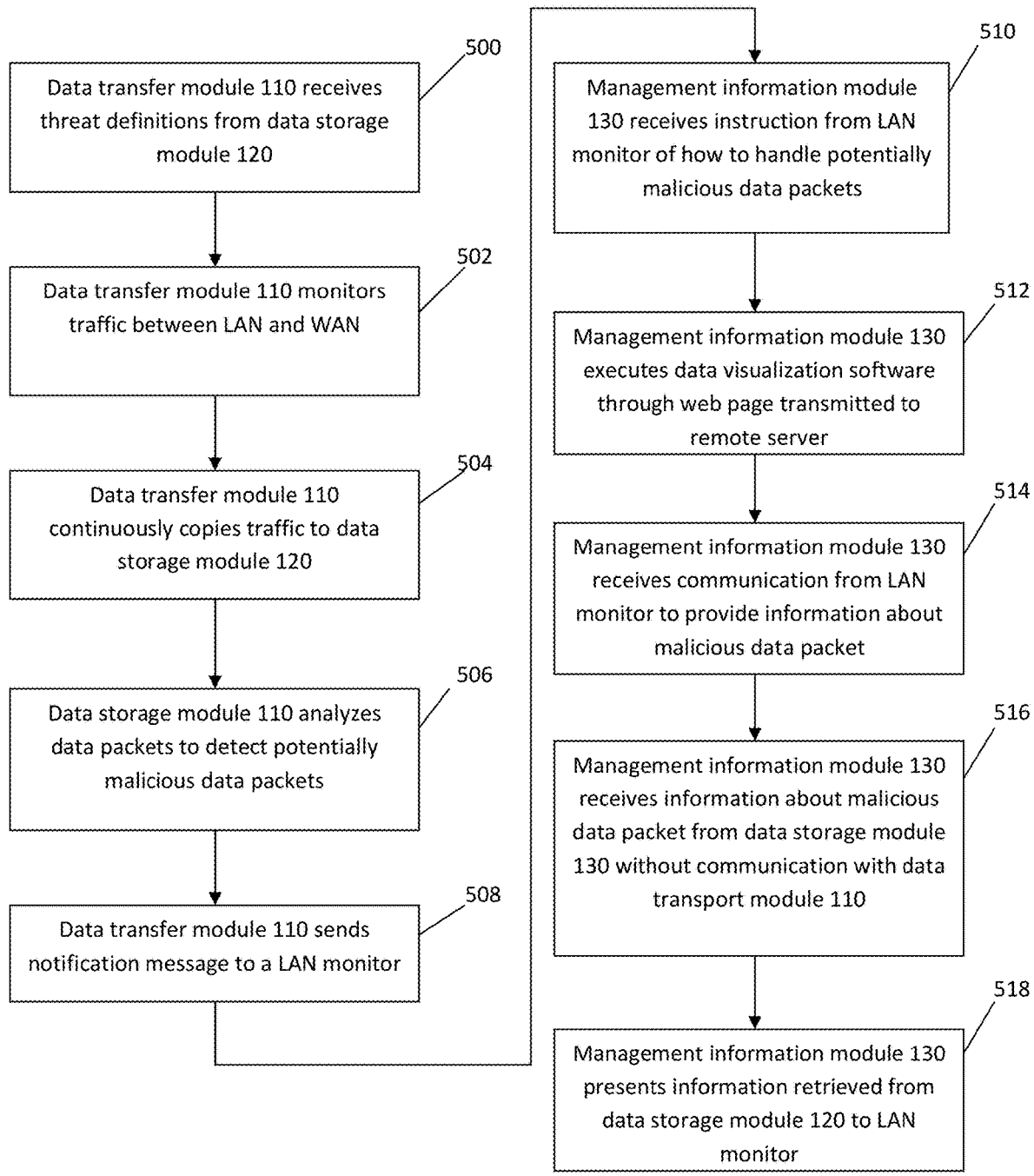
FIG. 5 is a flow chart showing a method of analyzing data transmissions, alerting a network monitoring user, and providing analysis and visualization of data transmissions according to certain aspects of an embodiment of the invention.

FIG. 5 provides a flowchart showing an overall method performed by computer security device 100 to analyze data transmissions flowing between the LAN and the WAN in order to detect potentially malicious data packets, alert a monitoring user of that detection of a potentially malicious data packet, and provide analysis and visualization of those potentially malicious data packets. At step 500, data transport module 110 receives threat definitions from data storage module 120. At step 502, data transport module 110 monitors data traffic flowing between the LAN and the WAN. At step 504, data transport module 110 continuously copies at least a portion of such data traffic (e.g., metadata associated with preferably each data packet) to data storage module 120 to maintain a record of such data traffic for a fixed prior time period (e.g., the hour prior to a given instant in time). At step 506, data storage module 110 analyzes the data packets to detect a potentially malicious data transmission. At step 508, the data storage module 110 sends a notification message to a LAN monitor indicating that a potentially malicious data transmission has been detected by data storage module 110. At step 510, optionally management information module 130 receives instructions from a LAN monitor to take action on the detected potentially malicious data transmission including at least one of passing the potentially malicious data transmission through computer security device 100, dropping the potentially malicious data transmission, or replacing the potentially malicious data transmission, and provides updated threat definitions to data storage module 120 that implement the instructions. At step 512, the data transport module 110 takes action on the potentially malicious data transmission including at least one of passing the potentially malicious data transmission through computer security device 100, dropping the potentially malicious data transmission, or replacing the potentially malicious data transmission, either automatically or in response to instruction received from data storage device 120 (e.g., from updated threat definitions received at data storage device 120 from management information module 130). At step 514, management information module 130 receives a request or instruction from a LAN monitor to provide information about the potentially malicious data transmission. At step 516, management information module 130 receives information about the malicious data transmission from data storage module 120 without communicating with data transport module 110. Finally, at step 518, management information module 130 presents information retrieved from data storage module 120 to the requesting LAN monitor.

While computer security device 100 provides significant enhancement to prior devices and methods for securing computers and computer networks, it may be additionally desirable to engage third party antivirus, anti-malware, and similarly configured protective software on individual LAN elements. For example, in the event that data transport module 110 determines that a LAN end-user node initiated a communication to a malicious WAN IP address, data transport module 110 would block such data transmission to that WAN IP address, effectively blocking a client-side attack (such as ransomware) that needs to communicate to an outside malicious WAN server for further instructions. Upon the detection of such a client-side attack, data transport module 110 may also take further action by notifying antivirus software on the end-user LAN node, causing such LAN node-installed software to initiate a scan and quarantine process to eliminate the client-side threat.

As mentioned above and referring again to FIG. 1, computer security device 100 preferably includes manual toggle 140 that is manually accessible from outside of computer security device 100. Manual toggle 140 is operable to direct data transport module 110 to change operation from one to another of four operating modes: namely, monitor, guard, remote access, or block. Using manual toggle 140, rather than a software-initiated procedure, provides greater levels of protection from remote and malicious tampering of computer security device 100. Engaging manual toggle 140 to cause computer security device 100 to operate in monitor mode instructs data transport module 110 to only provide monitoring functions, disabling all scenarios in which corrective action would be taken (such as file destruction or replacement). In such monitor mode, data transport module 100 preferably continues to log data into data storage module 120. Likewise, engaging manual toggle 140 to cause computer security device 100 to operate in guard mode instructs data transport module 110 to provide full operation as described above, including monitoring all data transmission through data transport module 110 and taking corrective actions such as data blocking or data replacement, as described above. Further, engaging manual toggle 140 to cause computer security device 100 to operate in remote access mode allows management information module 130 to receive configuration instructions from a WAN IP address. The WAN IP address can be a specific, pre-authorized IP address, adding a layer of security, or non-specific, allowing multiple third-party software support houses to access the configuration settings of management information module 130. This type of interaction would typically occur with remote support on the phone line with the end-user. Finally, engaging manual toggle 140 to cause computer security device 100 to operate in block mode disables all LAN/WAN traffic, but allows the LAN to continue to function, perhaps for analysis and debugging.

Using a system, method, and apparatus configured as above allows monitoring and management of all traffic flowing between a LAN and a WAN, while keeping the monitoring and management of all such traffic entirely invisible to elements outside of the computer security device 100. Moreover, providing such computer security device 100 with a remotely accessible management information module 130, which is prevented from any direct communication with data transport module 110 but is addressable as a LAN node to receive updated instructions and threat profiles for data transport module 110 to use, provides an easy-to-use device offering significantly improved security over previously known systems, methods, and devices.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A computer security device, comprising:
   a data transport module;
   a management information module;
   a data storage module in data communication with said data transport module and said management information module, said data storage module further comprising data memory and computer executable code configured to:
      prevent communication from said data transport module to said management information module;
      store in said data memory data threat definitions indicating potentially malicious data transmissions;
      receive from said management information module updates to said threat definitions; and
      copy threat definitions to said data transport module;
   said computer security device further comprising computer executable code configured to:
      analyze data traffic transferred between a local area network and a wide area network through said data transport module to detect potentially malicious data traffic;
      copy at least portions of said data traffic from said data transport module to said data storage module; and
      upon detection of potentially malicious data traffic, store a segment of said portion of said data traffic, wherein said segment comprises time samples prior to, at, and after a time of said potentially malicious data traffic being received at said data transport module.

2. The computer security device of claim 1, wherein said computer executable code is further configured to provide a user interface configured to enable a user of a remote local area network monitoring computer to analyze said segment of said portion of said data traffic.

3. The computer security device of claim 2, wherein said user interface is further configured to provide visualization of said data transmissions through said data transport module to said remote local area network monitoring computer.

4. The computer security device of claim 1, wherein said computer executable code is further configured to transmit said segment of said portion of said data traffic to a remote user for analysis outside of said computer security device.

5. The computer security device of claim 1, further comprising:
   a LAN communication port in data communication with said data transport module and configured for connection to a router on a local area network;
   a WAN communication port in data communication with said data transport module and configured for connection to a wide area network; and
   a management communication port in data communication with said management information module and configured for connection to said router.

6. The computer security device of claim 1, wherein said computer security device is in data communication with a local area network, and wherein said management information module is addressable as a node on said local area network having an IP address on said local area network.

7. The computer security device of claim 1, wherein said computer executable code of said computer security device is further configured to mirror an IP address of a transmitting element in said wide area network for communications with said local area network, and to mirror an IP address of a router on said local area network for communications with said transmitting element in said wide area network.

8. The computer security device of claim 1, wherein said data transport module and said data storage module are further configured to allow said data transport module to receive updated threat definitions from said data storage module.

9. The computer security device of claim 8, wherein said management information module and said data storage module are further configured to allow said data storage module to receive updated threat definitions from said management information module, and to allow said management information module to receive said segment of said portion of data traffic through said data transport module from said data storage module.

10. The computer security device of claim 1, wherein said computer executable code of said computer security device is further configured to send an electronic alert to a node on said local area network that is transmitting or receiving said potentially malicious data traffic.

11. The computer security device of claim 1, wherein said computer executable code of said computer security device is further configured to send an electronic alert to a node on said local area network other than a node on said local area network that is transmitting or receiving said potentially malicious data traffic.

12. The computer security device of claim 1, wherein said computer executable code of said computer security device is further configured to send an electronic alert to a remote computer on said wide area network.

13. The computer security device of claim 1, further comprising a manually operable toggle switch in communication with said data transport module and configured to cause said data transport module to change operation from one to another of multiple operating modes.

14. A method of monitoring data transmissions between a local area network and a wide area network, comprising the steps of:
providing a computer security device, comprising:
a data transport module;
a management information module;
a LAN communication port in data communication with said data transport module and configured for connection to a router on a local area network;
a WAN communication port in data communication with said data transport module and configured for connection to a wide area network; and
a data storage module in data communication with said data transport module and said management information module, said data storage module further comprising data memory and computer executable code configured to:
prevent communication from said data transport module to said management information module;
store in said data memory data threat definitions indicating potentially malicious data transmissions;
receive from said management information module updates to said threat definitions; and
copy threat definitions to said data transport module;
said computer security device further comprising computer executable code configured to:
analyze data traffic transferred between said local area network and said wide area network through said data transport module to detect potentially malicious data traffic;
copy at least portions of said data traffic from said data transport module to said data storage module; and
upon detection of potentially malicious data traffic, store a segment of said portion of said data traffic, wherein said segment comprises time samples prior to, at, and after a time of said potentially malicious data traffic being received at said data transport module;
transferring data between said LAN communication port and said router;
transferring data between said WAN communication port and an access point to said wide area network; and
causing said data management module to monitor data traffic between said local area network and said wide area network to detect potentially malicious data transmissions.

15. The method of claim 14, said computer security device further comprising a management communication port in data communication with said management information module and configured for connection to said router, the method further comprising the step of causing said management information module to establish a data connection through said management communication port with one of either a node on said local area network or a remote server.

16. The method of claim 15, further comprising the step of addressing said management information module as a node on said local area network having an IP address on said local area network.

17. The method of claim 14, further comprising the step of generating a web page at said management information module, and transmitting said web page from said management information module to said one of either a node on said local area network or a remote server.

18. The method of claim 17, further comprising the step of receiving updated threat definitions at said management information module from said one of either a node on said local area network or a remote server.

19. The method of claim 18, further comprising the step of causing said management information module to copy said updated threat definitions to said data storage module.

20. The method of claim 17, further comprising the step of causing said management information module to execute data visualization software through said web page that displays information about said data traffic through said data transport module.

21. The method of claim 14, further comprising the step of copying at least portions of said data traffic from said data transport module to said storage module.

22. The method of claim 21, further comprising the step of detecting a potentially malicious data packet being received at said data transport module.

23. The method of claim 22, further comprising the step of in response to detecting a potentially malicious data packet, storing a segment of said portion of said data traffic, wherein said segment comprises time samples prior to, at, and after a time of said potentially malicious data packet being received at said data transport module.

24. The method of claim 23, further comprising the step of causing said management information module to generate a webpage and transmit said webpage to a remote local area network monitoring computer, wherein said webpage provides a user interface configured to enable said user to analyze said segment of said portion of said data traffic.

* * * * *